United States Patent

Sassano

[11] Patent Number: 5,867,812
[45] Date of Patent: Feb. 2, 1999

[54] REGISTRATION APPARATUS FOR COMPOUND-WORD DICTIONARY

[75] Inventor: Manabu Sassano, Kawasaki, Japan

[73] Assignee: Fujitsu Limited, Kawasaki, Japan

[21] Appl. No.: 615,082

[22] Filed: Mar. 14, 1996

Related U.S. Application Data

[63] Continuation-in-part of Ser. No. 492,688, Jun. 20, 1995, abandoned, which is a continuation of Ser. No. 91,016, Jul. 14, 1993, abandoned.

[30] Foreign Application Priority Data

Aug. 14, 1992 [JP] Japan .................................. 4-216937

[51] Int. Cl.⁶ .................................................. G06F 17/28
[52] U.S. Cl. ...................................... 704/10; 704/7; 704/8; 707/532; 707/536
[58] Field of Search ........................... 704/1, 2, 10, 4, 704/6, 7, 8; 707/532, 533, 536

[56] References Cited

U.S. PATENT DOCUMENTS

| | | | |
|---|---|---|---|
| 4,586,160 | 4/1986 | Amano et al. | 704/8 |
| 4,672,571 | 6/1987 | Bass et al. | 707/533 |
| 4,701,851 | 10/1987 | Bass et al. | 707/533 |
| 4,706,212 | 11/1987 | Toma | 704/2 |
| 4,777,617 | 10/1988 | Frisch et al. | 704/8 |
| 4,873,634 | 10/1989 | Frisch et al. | 707/533 |
| 4,890,230 | 12/1989 | Tanoshima et al. | 704/3 |
| 5,029,084 | 7/1991 | Morohasi et al. | 704/9 |
| 5,065,318 | 11/1991 | Kugimiya et al. | 704/6 |
| 5,161,105 | 11/1992 | Kugimiya et al. | 704/4 |
| 5,225,981 | 7/1993 | Yokogawa | 704/2 |

FOREIGN PATENT DOCUMENTS

| | | |
|---|---|---|
| 61-184676 | 8/1986 | Japan . |
| 3-068061 A | 3/1991 | Japan . |
| 3-286372 | 12/1991 | Japan . |
| 3-286372 A | 12/1991 | Japan . |
| 6-068070 | 3/1994 | Japan . |
| 61-184676 | 8/1996 | Japan . |

Primary Examiner—Joseph Thomas
Attorney, Agent, or Firm—Staas & Halsey

[57] ABSTRACT

A registration apparatus for a compound-word dictionary automatically and suitably determines whether a combination of character strings must be registered as one entry word in a compound-word dictionary. The registration apparatus comprises a character string segmenter which segments a compound-word into its individual words. The frequency that each individual word occurs in entry words of a compound-word dictionary is determined by an occurrence frequency calculator. An evaluation value calculator calculates an evaluation value based on the occurrence frequencies. Based on this evaluation value, a register determiner then determines if the compound-word is to be registered in the compound-word dictionary. The process for obtaining an evaluation value may depend on the number of component words and contents of the existing dictionary, a physical size limit on the compound-word dictionary and the purpose of use of the dictionary.

12 Claims, 5 Drawing Sheets

Fig. 3A

WORD DICTIONARY

| JAPANESE NOTATION | PRONUNCIATION | PART OF SPEECH | ENGLISH EQUIVALENT |
|---|---|---|---|
| 基金 | kikin | noun | fund |
| 国際 | kokusai | noun | international |
| 語 | go | noun | word, language |
| 三 | san | noun | three |
| トルコ | toruko | noun | Turkey |
| 日本 | nihon | noun | Japan |
| は | ha | postpositional particle (topic marker) | |
| 破産 | hasan | noun | bankruptcy |

Fig. 3B

COMPOUND WORD DICTIONARY

| JAPANESE NOTATION | PRONUNCIATION | ENGLISH EQUIVALENT |
|---|---|---|
| 国際・化 | kokusai・ka | internationalize |
| 国際・単位 | kokusai・tan-i | international unit |
| 国際・連合 | kokusai・rengou | UNITED NATION |
| ⋮ | ⋮ | ⋮ |
| ドイツ・語 | doitsu・go | German |
| 日本・語 | nihon・go | Japanese |
| フランス・語 | furansu・go | French |

REGISTRATION APPARATUS FOR COMPOUND-WORD DICTIONARY

CROSS REFERENCE TO RELATED APPLICATION

This application is a continuation-in-part application of Ser. No. 08/492,688 filed on Jun. 20, 1995, now abandoned which is file wrapper continuation application of Ser. No. 08/091,016 filed on Jul. 14, 1993 now abandoned.

BACKGROUND OF THE INVENTION

1. Field of the Invention

The present invention relates to a registration apparatus for a compound-word dictionary. A compound-word dictionary in the present invention is employed in a machine translation apparatus, a Japanese kana-kanji converter i.e., a Japanese syllable-Chinese character converter, or the like. In general, necessary compound words can be added to this kind of compound-word dictionary. The present invention relates to an apparatus for automatically judging whether or not to register a new compound word in a compound-word dictionary and registering a compound word, which has been judged to be registered, as an entry word in the compound-word dictionary.

2. Description of the Related Art

In a compound-word dictionary, when the number of entry words increases, the precision in natural language analysis improves. However, the compound-word dictionary gets larger in size. A large number of compound words that exceeds the capacity of the compound-word dictionary cannot be registered. In the past, the following criteria have been proposed for automatically judging whether or not to register a new compound word in a compound-word dictionary:

(a) When a compound word is an undefined word and is comprised of defined individual words, the compound word is not registered as an entry word in the compound-word dictionary;

(b) When a compound word is an undefined word, the undefined compound word is registered as an entry word in the compound-word dictionary; or (c) The literature is inspected, and compound words appearing in the literature and having high use frequencies are registered in the compound-word dictionary.

However, in (a) above, even though a compound-word to be registered as one word will not be registered as an entry word, when the compound word is processed in a machine translator or a kana-kanji converter using an unsuitable compound dictionary, a suitable expression will not be chosen in machine translation and a string kana (Japanese syllable) will be converted to an unsuitable kanji (Chinese character) during kana-kanji conversion.

In (b) above, since all of the undefined compound words will be registered as entry words in the compound-word dictionary, the size of the compound-word dictionary becomes too large.

Under the criterion (c), the literature concerning diverse fields must be inspected. If the range of fields to be inspected is narrow, compound words employed in specific fields alone are registered in the compound-word dictionary.

SUMMARY OF THE INVENTION

It is an object of the present invention to provide a registration apparatus for a compound-word dictionary, which automatically determines whether to register a combination of characters or words as one compound word, can reduce the size of the dictionary, and can make the natural language analysis process accurate.

For accomplishing the foregoing object, a registration apparatus for a compound-word dictionary in accordance with the present invention investigates the occurrence frequencies of individual character strings constituting entry words that have already been registered in a compound-word dictionary. There is a high possibility that the individual character strings constituting an entry word in an existing compound-word dictionary may become elements of another combination of character strings. It is therefore highly probable that a combination of character strings consisting of character strings whose occurrence frequencies in the compound-word dictionary are high may be an appropriate combination of character strings to be registered in the compound-word dictionary. The registration apparatus for a compound-word dictionary in accordance with the present invention judges whether or not to register a combination of character strings in a compound-word dictionary on the basis of the occurrence frequencies of character strings constituting the combination of character strings in the compound-word dictionary.

The registration apparatus for a compound-word dictionary in accordance with the present invention includes a compound-word dictionary having combinations of character strings as entry words. When a combination of character strings is input to the registration apparatus of the present invention, the combination of character strings is segmented into individual character strings. The occurrence frequencies of the segmented character strings in entry words that have already been registered in the compound-word dictionary are calculated. Based on the occurrence frequencies, an evaluation value of the combination of character strings is calculated. When the evaluation value is equal to or larger than a given value, the combination of character strings is registered as an entry word of the compound-word dictionary. When the evaluation value is lower than the given value, the combination of character strings is not registered in the compound-word dictionary.

As mentioned above, based on the occurrence frequencies of character strings in combinations of character strings that have already been registered in a compound-word dictionary, it is judged whether or not a combination of character strings should be registered. Consequently, an appropriate combination of character strings is added to the compound-word dictionary. An object of inspection is only the compound-word dictionary. Literature in a wide range of fields need not be inspected. The time required for registration can therefore be reduced. When a given value relative to an evaluation value is selected appropriately, the size of the compound-word dictionary can be set properly.

Incidentally, the part of speech, the transcript and the like, of the entry word registered in the compound-word dictionary are input using a known art afterward.

BRIEF DESCRIPTION OF THE DRAWINGS

The above-described object and features of the present invention will be more apparent from the following description of the preferred embodiment with reference to the accompanying drawings.

FIG. 2A shows a structure of a first example of the registration apparatus for a compound-word dictionary. FIG. 2B shows the result of Japanese-English translation;

FIGS. 3A and 3B are views showing contents of dictionaries. FIG. 3A shows a part of the contents of a word dictionary. FIG. 3B shows a part of the contents of a compound-word dictionary;

FIG. 5A shows a structure of a second example of the registration apparatus for a compound-word dictionary. FIG. 5B shows the result of kana-kanji conversion.

DESCRIPTION OF THE PREFERRED EMBODIMENTS

Before describing the embodiments of the present invention, the principle of the present invention will be described with reference to the related figures.

Figure 1:
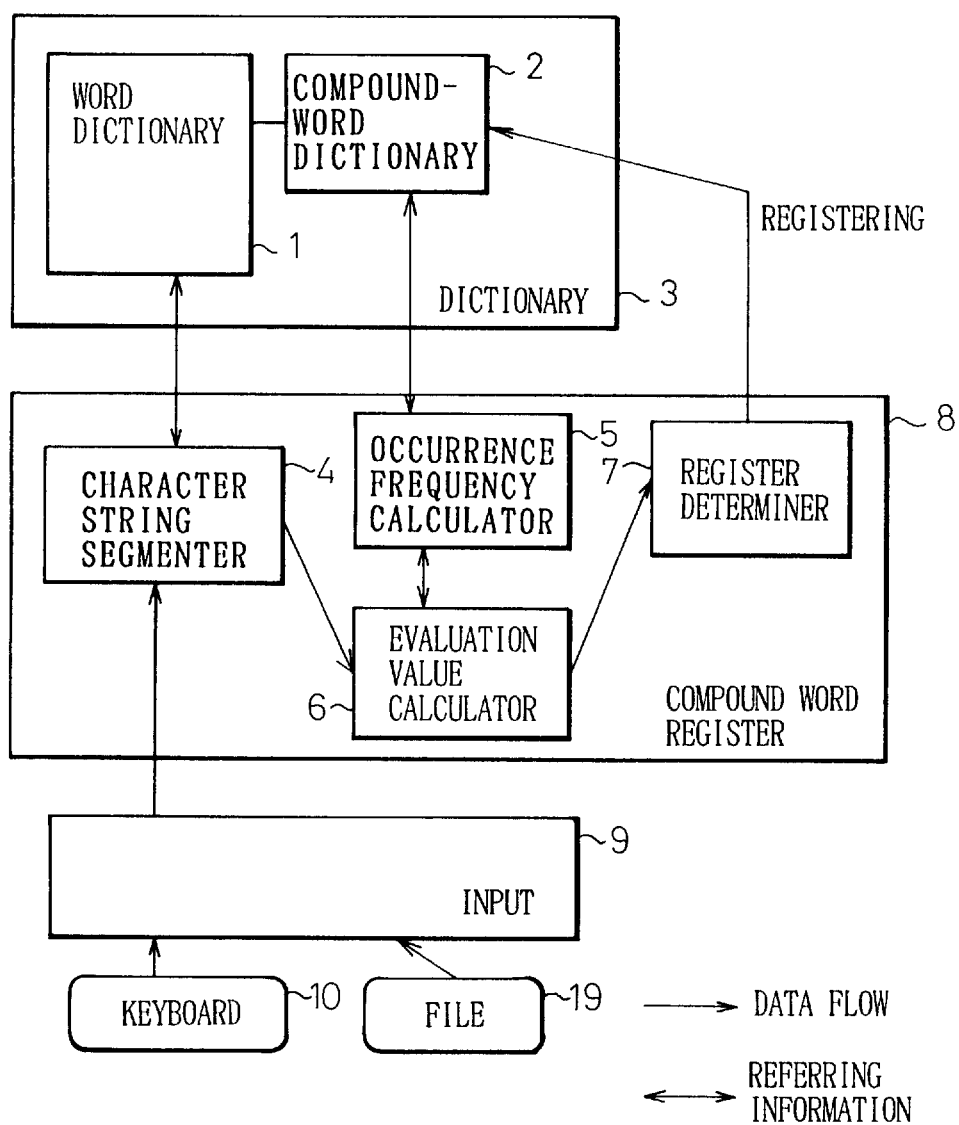
FIG. 1 is a view showing the principle of the registration apparatus for a compound-word dictionary.

FIG. 1 shows the principle of the registration apparatus for a compound-word dictionary. In the figure, a dictionary 3 includes a word dictionary 1 and a compound-word dictionary 2 to record combinations of character strings. A compound-word register 8 includes a character-string segmenter 4, an occurrence-frequency calculator 5, an evaluation-value calculator 6, and a register determiner 7.

The character-string segmenter 4 segments a combination of character strings into individual character strings. The occurrence-frequency calculator 5 calculates the occurrence frequency of the segmented individual character strings based on references in the compound-word dictionary 2.

The evaluation-value calculator 6 obtains an evaluation value corresponding to an input combination of character strings according to the occurrence frequency calculated by the occurrence-frequency calculator 5. The register determiner 7 determines whether the input combination of character strings needs to be registered as an entry in the compound-word dictionary 2.

A combination of character strings is input from a keyboard 10 or a file 19 to the compound-word register 8 via an input means 9. The combination of character strings is segmented into individual character strings by the word segmenter 4. The occurrence-frequency calculator 5 calculates the occurrence frequency of each segmented character string according to references in the compound-word dictionary 2.

The evaluation value calculator 6 obtains an evaluation value according to the occurrence frequency. The register determiner 7 determines, on the basis of the evaluation value, whether or not to register the combination of character strings in the compound-word dictionary 2. When it has determined that the character strings should be registered, the register determiner 7 registers the combination of character strings as an entry word of the compound-word dictionary. Thereafter, the part of speech, the transcript, and the like, of the entry word registered in the compound-word dictionary are input using another dictionary according to a known art.

An example of registering a compound word in a compound-word dictionary used for machine translation, and an example of registering a compound word in a compound-word dictionary used for kana-kanji conversion will be described below.

Figures 2A, 2B:
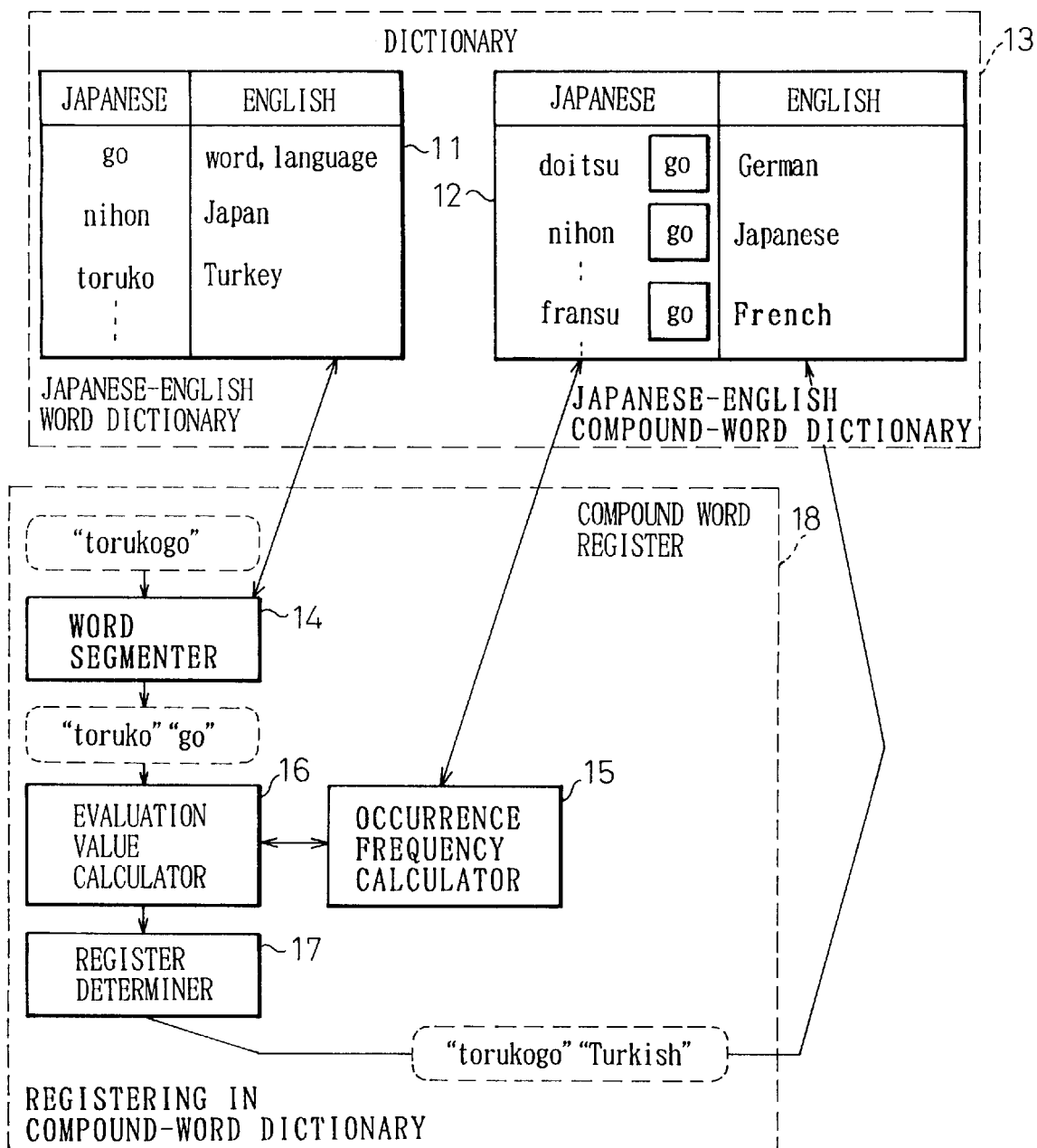
FIGS. 2A and 2B are views of a first example of the present invention.

FIG. 2A shows a structure of the first embodiment of the present invention, and FIG. 2B shows a result of a Japanese-English translation through the translation machine using 2 different states of compound-word dictionaries.

In this embodiment, whether a Japanese compound word is registered as an entry word in a compound-word dictionary which is used for Japanese-English machine translation is determined.

In FIG. 2A, a dictionary 13 is composed of a Japanese-English word dictionary 11 and a Japanese-English compound-word dictionary 12. The Japanese-English word dictionary 11 contains Japanese entry words and their English equivalent words. The Japanese-English compound-word dictionary 12 contains Japanese entry words (compound words) and their English equivalent words.

A compound-word register 18 is composed of a word segmenter 14, an occurrence frequency calculator 15, an evaluation value calculator 16, and a register determiner 17.

The word segmenter 14 segments a compound word into individual words. The occurrence frequency calculator 15 calculates an occurrence frequency for each individual word of the entry word in the Japanese-English compound-word dictionary 12.

The evaluation-value calculator 16 obtains an evaluation value of a compound-word according to the occurrence frequency calculated by the occurrence frequency calculator 15. The register determiner 17 determines whether the compound word needs to be registered as an entry word in the compound-word dictionary 12 in response to the evaluation value obtained by the evaluation-value calculator 16. Additionally, it registers the compound word determined to need registering into the Japanese-English compound-word dictionary 12.

FIG. 3A shows a part of the contents of a Japanese-English word dictionary 11. The Japanese-English word dictionary 11 contains Japanese notation, pronunciation, the part of speech, and an English equivalent for each word. FIG. 3B shows a part of the contents of a Japanese-English compound-word dictionary 12. The Japanese-English compound-word dictionary 12 contains Japanese notation, pronunciation, and an English equivalent for each compound word.

Registration of a compound word in a compound-word dictionary is possible before, in the course of, and after machine translation. Preferably, before machine translation, a plurality of compound words are picked up from part of a literature to be translated. Assuming that "torukogo" ("turkish" in English) is picked up as one of the compound words, the processing will be described using the relevant drawings.

The Japanese compound word "torukogo" is compound of "toruko" and "go". The Japanese word "toruko" means "Turkey" in English, the Japanese word "go" means "word" or "language" in English, and the compound word "torukogo" means "Turkish" in English.

The Japanese compound word "torukogo" is input into the compound-word register 18 via an input means such as a keyboard or a file (not shown).

The word segmenter 14 segments the Japanese compound word "torukogo" into the word "toruko" and the word "go" based on the words registered in the Japanese-English word dictionary 11 (refer to FIG. 3A). The occurrence frequency calculator 15 calculates the occurrence frequency $f(w_k, i)$ of the words "toruko" and the word "go" in the Japanese-English compound-word dictionary 12 (refer to FIG. 3B).

Figure 4:
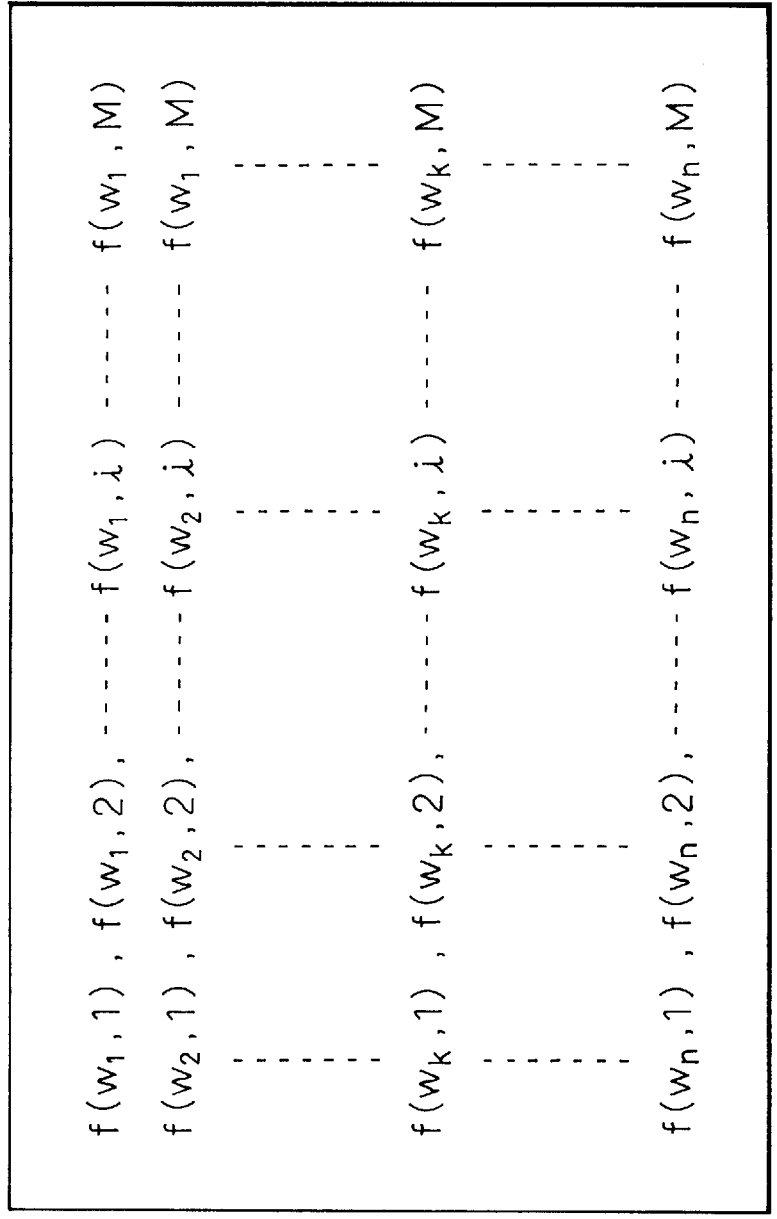
FIG. 4 is a view showing the contents of an occurrence frequency table.

An occurrence frequency $f(w_k, i)$ will be described. $w_k$ means that a word concerned is the k-th word of an input compound word. If an input compound word is "torukogo", "toruko" is indicated with $w_1$ and "go" is indicated with $w_2$.

i means the order of a word in a compound word contained in the compound-word dictionary 12. Assuming that "toruko-ishi" is contained in the compound-word dictionary, "toruko" has an i value of 1. An occurrence frequency $f(w_1,1)$ is therefore incremented by one. If "nihon-go" is present, since "go" has an i value of 2, an occurrence frequency $f(w_2,2)$ is incremented by one. If "go-i" is present, since "go" has an i value of 1, an occurrence frequency $f(w_2,2)$ is incremented by one. As a result, as shown in FIG. 4, the occurrence frequencies $f(w_k,i)$ are set for each word and order. In the drawing, n denotes the number of words. M denotes a maximum value among the numbers of words constituting compound words in the compound-word dictionary.

The evaluation-value calculator 16 obtains an evaluation value e. The evaluation value e will be described. The evaluation value e is determined by weighting each occurrence frequencies $f(w_k,i)$.

A weight weight(k,i) is determined in terms of grammatical information and a position of occurrence of a word according to the following expression (1):

$$weight(k,i) = g(w_k,i) + \begin{cases} weight_s & (k = i) \\ weight_{normal} & (k \neq i) \end{cases} \quad (1)$$

where function $g(w_k,i)$ is a function for checking the grammatical information of a word $w_k$ and giving a bonus. For example, $w_1$ indicates a word that is frequently used as a prefix. Function $g(w_1,1)$ gives a larger bonus than a function to which $k \neq 1$ are assigned. Likewise, when $w_n$ indicates a word frequently used as a suffix, a large bonus is given.

weight$_s$ means a weight applied under the condition of k=i, while weight$_{normal}$ means a weight applied under the condition of k≠i. The relationship of weight$_s \geq$ weight$_{normal} \geq 0$ is established. That is to say, when the order of a word occurring in an input compound word agrees with the order of the word in another compound word in a compound-word dictionary, a larger weight is applied.

The evaluation value e is calculated by weighting occurrence frequencies $f(w_k,i)$ according to the following expression (2):

$$e = \sum_{k=1}^{n} \sum_{i=1}^{M} weight(k,i) \cdot f(w_k,i) \quad (2)$$

where M denotes a maximum value among the numbers of component words of compound words contained in a compound-word dictionary.

The evaluation value e may be a total sum of occurrence frequencies $f(w_k,i)$, wherein the weighting included in the expression (2) is omitted. As for the weighting to be applied by the expression (1), only one of the weighting relative to grammatical and the weighting relative to a position i may be applied.

The register determiner 17 determines whether the compound word needs to be registered as an entry word in the Japanese-English compound-word dictionary 12 based on an evaluation value e obtained by the evaluation-value calculator 16. If the e value is equal to or larger than a given value $h_e$, the register determiner 17 registers "toruko-go" as an entry word in the Japanese-English compound-word dictionary 12. If the e value is smaller than the given value $h_e$, "toruko-go" is not registered. Thereafter, the equivalent or "turkish" is registered in relation to "toruko-go" by referencing another large-capacity dictionary.

The given value $h_e$ determines the number of compound words to be registered in the compound-word dictionary 12. The given value $h_e$ is therefore set to an appropriate value in consideration of the size of the compound-word dictionary or the like. The value can be modified in the meantime.

When the Japanese compound word "torukogo" is registered as an entry word into the Japanese-English compound-word dictionary 12 based on the process described hereinbefore, the Japanese compound word "torukogo" is translated to "Turkish" through Japanese-English machine translation.

As shown in FIG. 2B, before the registration of the Japanese compound word "torukogo" into the Japanese-English compound-word dictionary 12, the Japanese compound word "torukogo" would not be translated to "Turkish" in English correctly. Instead, it would be translated to "Turkey word" in English.

By contrast, after the registration of the Japanese compound word "torukogo" to the Japanese-English compound-word dictionary 12, the Japanese compound word "torukogo" is correctly translated to "Turkish" in English.

When an evaluation value e of a compound word does not exceed the predetermined value $h_e$, the compound word is not registered in the compound-word dictionary. As a result, the size of the compound-word dictionary does not become too large.

Figures 5A, 5B:
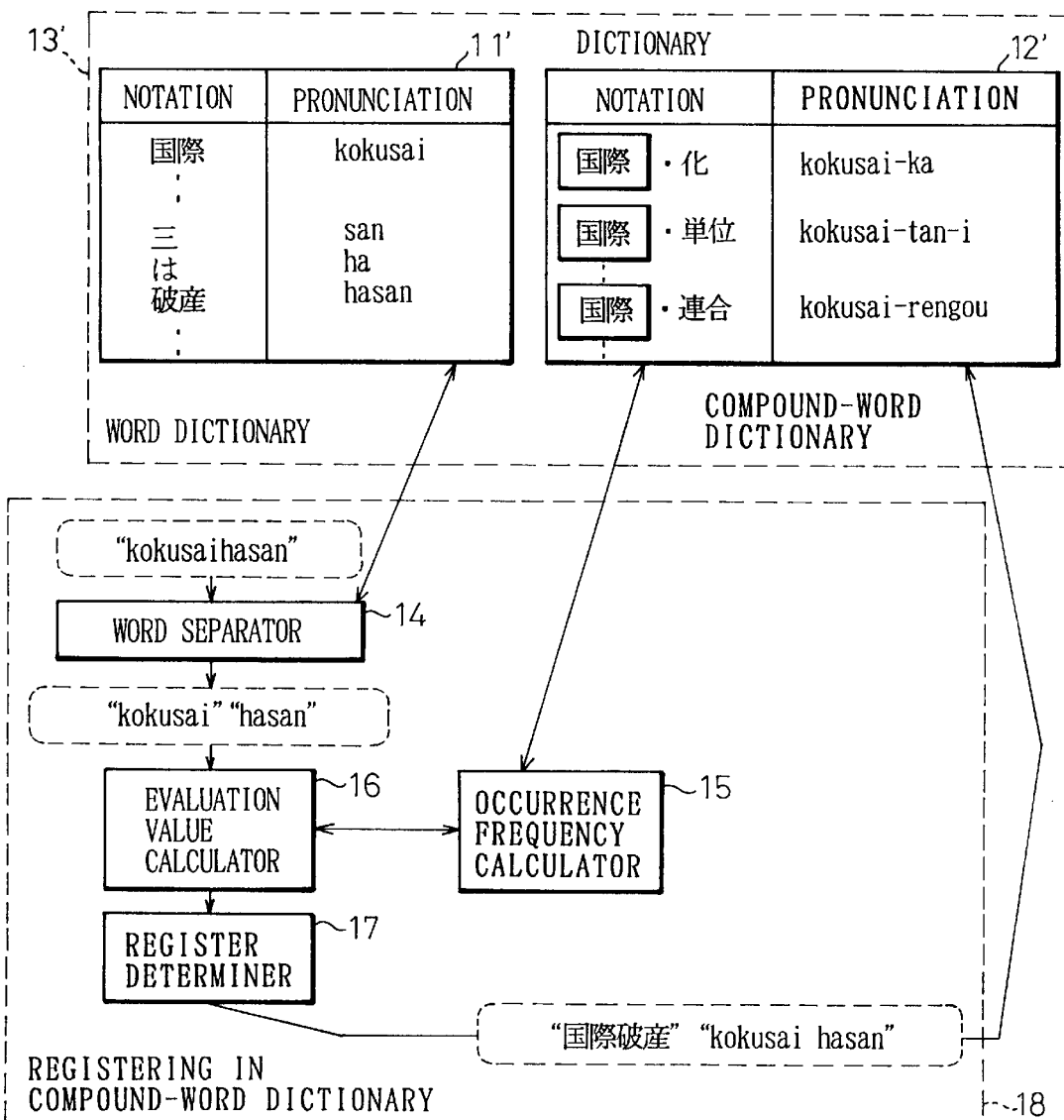
FIGS. 5A and 5B are views of a second example of the present invention.

FIG. 5A shows a structure of the second embodiment of the present invention. In this embodiment, it is determined whether a compound word is registered as a compound word in a compound-word dictionary used for kana-kanji conversion or Japanese syllable-Chinese character conversion.

The kana-kanji converter converts kana (Japanese syllables) to kanji (Chinese characters), i.e., converts one notation to another notation in the same language. In this embodiment, the conversion process is executed based on a longest match principle. This principle is that the longest separable phrase is preceded. This method is commonly used in kana-kanji conversion.

The process to determine whether the Japanese compound word, for example, "kokusaihasan" ("international bankruptcy" in English), is registered as an entry word into a compound-word dictionary 12' will be described hereinafter with reference to FIGS. 5A and 5B.

The Japanese compound word "kokusaihasan" is composed of "kokusai" and "hasan". The Japanese word "kokusai" means "international" in English, the Japanese word "hasan" means "bankruptcy" in English.

The Japanese compound word "kokusaihasan" is input into the compound word register 18 via an input unit such as a keyboard or a file (not shown). The word segmenter 14 segments the Japanese compound word "kokusaihasan" into the word "kokusai" and the word "hasan" based on the words registered in the word dictionary 11'. The occurrence frequency calculator 15 calculates an occurrence frequency of the word "kokusai" and of the word "hasan" in the compound-word dictionary 12' based on the frequency table (refer to FIG. 4) generated by the occurrence frequency calculator 15.

The evaluation-value calculator 16 obtains an evaluation value. The evaluation value used to determine whether the Japanese compound word "kokusaihasan" needs to be registered as an entry word in the compound-word dictionary 12' based on the occurrence frequency of the Japanese word "kokusai" or the word "hasan" obtained by the occurrence frequency calculator 15.

The register determiner 17 determines whether the compound word needs to be registered as an entry word to the compound-word dictionary 12' based on an evaluation value obtained by the evaluation-value calculator 16. When the evaluation value exceeds a predetermined threshold value, the register determiner 17 registers the Japanese compound word as an entry word to the compound-word dictionary 12'. When the evaluation value does not exceed the predetermined value, the register determiner 17 does not register the Japanese compound word.

When the Japanese compound word "kokusaihasan" is registered as an entry word in the compound-word dictionary 12' based on the process described hereinbefore, the Japanese compound word "kokusaihasan" is converted to Chinese character as shown in FIG. 5B through kana-kanji conversion.

As shown in FIG. 5B, before the registration of the Japanese compound word "kokusaihasan" as an entry word in the compound-word dictionary 12', the kana-kanji converter may not correctly convert the Japanese compound word "kokusaihasan" to "kokusai-hasan". Instead, it may convert it to "kokusai-ha-san" because the Japanese word "ha" is a postpositioned word functioning as an auxiliary to a main word "kokusai". The kana-kanji converter may thus segment "hasan" to "ha" and "san".

By contrast, after the registration of the Japanese compound word "kokusaihasan" in the compound-word dictionary 12', the kana-kanji converter correctly converts the Japanese compound word "kokusaihasan" to "kokusai-hasan".

When an evaluation value of a compound word does not exceed the predetermined threshold value, the compound word is not registered in the compound-word dictionary. Therefore, the size of the compound-word dictionary does not become too large.

According to the present invention, the registration apparatus for a compound-word dictionary determines automatically whether a combination of character strings or word strings needs to be registered as one entry word in the compound-word dictionary, thereby reducing the size of the dictionary, and making the natural language analysis process more accurate.

When the compound-word dictionary generated by the present invention is used for machine translation, or kana-kanji conversion, the correct translation or the conversion result can be obtained.

It will be understood that although the present invention has been described with reference to a Japanese-English translator and kana-kanji conversion, the present invention is applicable to other kinds of systems.

I claim:

1. An apparatus for registering a combination of character strings in a compound-word dictionary, comprising:

a word dictionary containing a plurality of words;

a compound-word dictionary containing entry words that are combinations of character strings;

segmenting means for segmenting an input combination of character strings into individual character strings by referring to said word dictionary;

occurrence frequency calculating means for calculating an occurrence frequency of each of said segmented individual character strings in said entry words in said compound-word dictionary;

evaluation value calculating means for calculating the evaluation value of said input combination of character strings on the basis of said calculated occurrence frequencies of each of said segmented individual character strings; and means for determining whether or not to register said combination of character strings in said compound-word dictionary on the basis of said evaluation value, and registering said combination of character strings as an entry word in said compound-word dictionary when it is determined that said combination of character strings should be registered.

2. An apparatus for registering a compound word in a compound-word dictionary, comprising:

a word dictionary containing a plurality of words;

a compound-word dictionary containing entry words that are compound words;

segmenting means for segmenting an input compound word into individual words by referring to said word dictionary;

occurrence frequency calculating means for calculating an occurrence frequency of each of said segmented individual words in said entry words in said compound-word dictionary;

evaluation value calculating means for calculating the evaluation value of said input compound word on the basis of said calculated occurrence frequencies of each of said segmented individual words; and means for determining whether to register said compound word in said compound-word dictionary on the basis of said evaluation value, and registering said compound word as an entry word in said compound-word dictionary when it is determined that said compound word should be registered.

3. An apparatus according to claim 2, wherein, the compound-word dictionary includes compound-words in a first language in correspondence with equivalent words in a second language.

4. An apparatus according to claim 3, wherein for each said compound-word in the first language, the compound-word dictionary contains, in correspondence with said corresponding compound-word in the first language, notation, pronunciation, and the corresponding equivalent word in the second language.

5. An apparatus according to claim 3, wherein:

the evaluation value is calculated based on grammar information concerning each individual word of the compound-word, in addition to the occurrence frequency.

6. An apparatus according to claim 3, wherein:

each individual word in the compound-word has a position within the compound-word; and the evaluation value is calculated according to the position of each individual word in the compound-word, in addition to the occurrence frequency.

7. An apparatus according to claim 2, wherein:

the compound-word dictionary includes compound-words converted by the segmenting means from one notation to another notation in the same language.

8. An apparatus according to claim 7, wherein:

the compound-word dictionary includes notation and pronunciation for each compound-word.

9. An apparatus according to claim 7, wherein:

the evaluation value is obtained based on grammar information about each individual word of the compound-word, in addition to the occurrence frequency.

10. An apparatus according to claim 7, wherein:

the evaluation value is calculated based on the position of each individual word in the compound-word, in addition to the occurrence frequency.

11. An apparatus according to claim 2, wherein:

the compound-word dictionary includes compound words in the form of a first notation and a second notation in the same language.

12. An apparatus according to claim 11, wherein:

said first notation is a Japanese notation using Chinese characters and the second notation is a Japanese notation based on pronunciation.

* * * * *

UNITED STATES PATENT AND TRADEMARK OFFICE
CERTIFICATE OF CORRECTION

PATENT NO.: 5,867,812
DATED : February 2, 1999
INVENTOR(S): Manabu SASSANO

It is certified that error appears in the above-identified patent and that said Letters Patent is hereby corrected as shown below:

On the title page, [56] References Cited, Foreign Patent Documents, the third line, delete "3-286372 12/1991 Japan".

the last line, delete "61-184676 8/1996 Japan".

Signed and Sealed this

Fourteenth Day of December, 1999

Attest:

Q. TODD DICKINSON

*Attesting Officer*   *Acting Commissioner of Patents and Trademarks*